Figure 6:
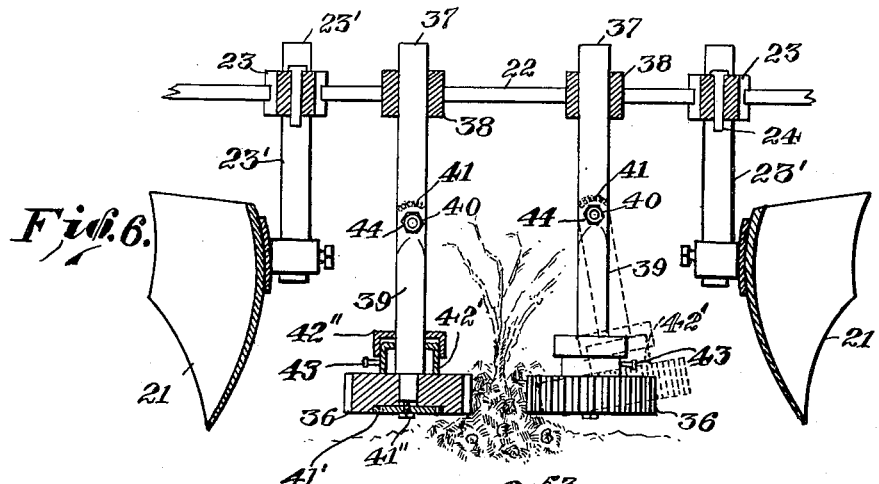

Sept. 3, 1957  C. D. RITCHIE  2,804,813
TRACTOR POWERED ROTARY CULTIVATOR
Filed Dec. 16, 1953  3 Sheets-Sheet 1
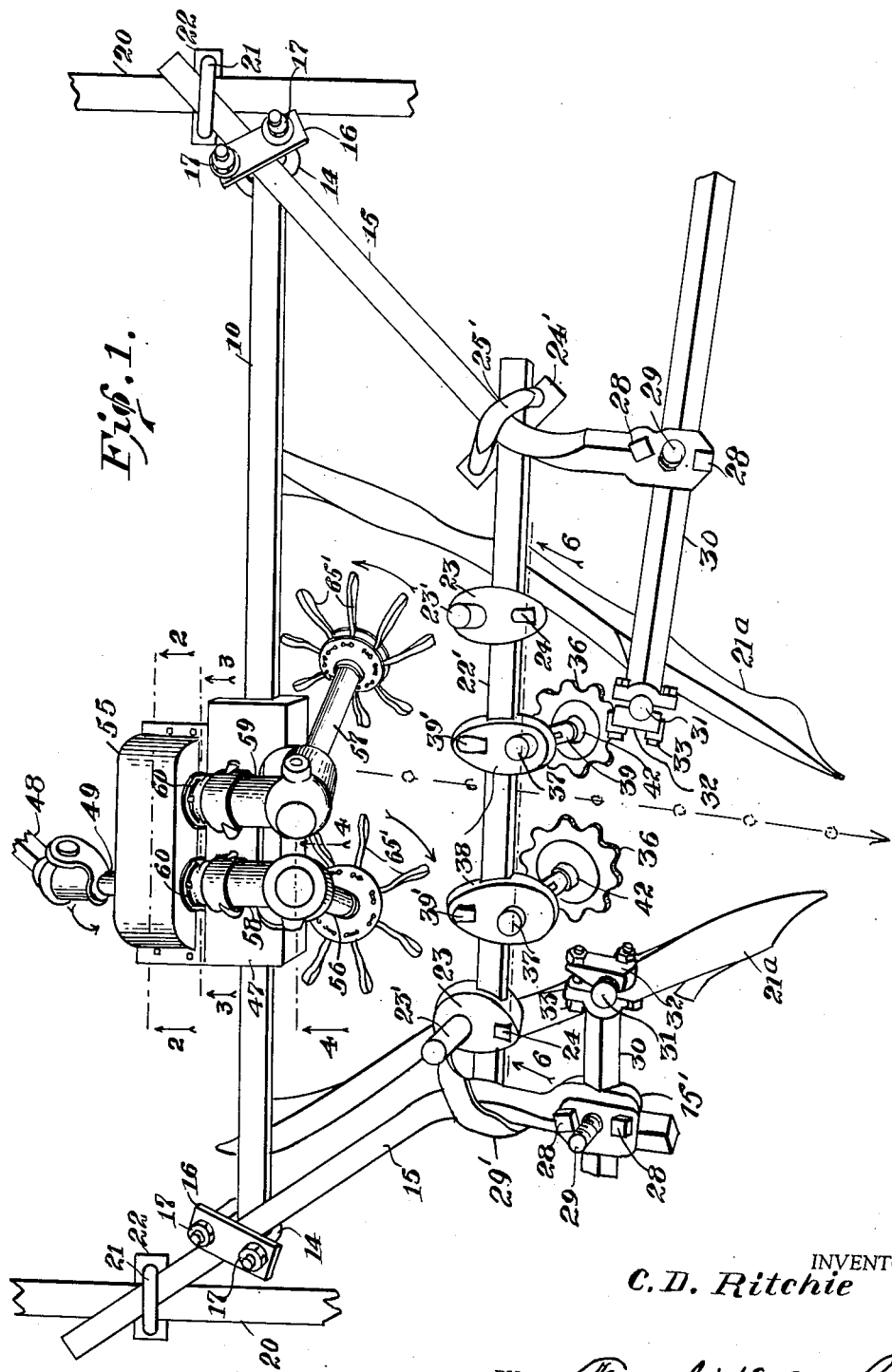
INVENTOR
C. D. Ritchie
BY Frank W. Dahm
ATTORNEY

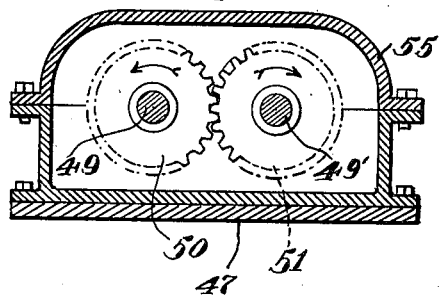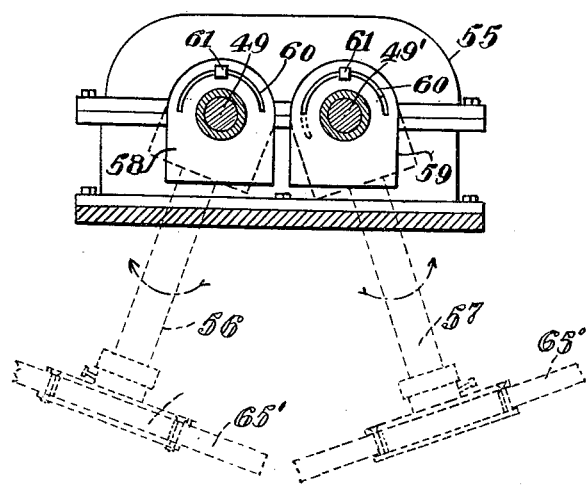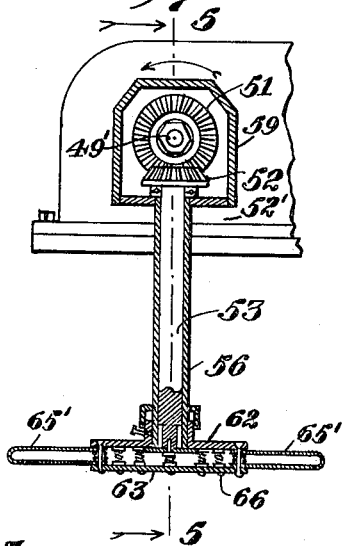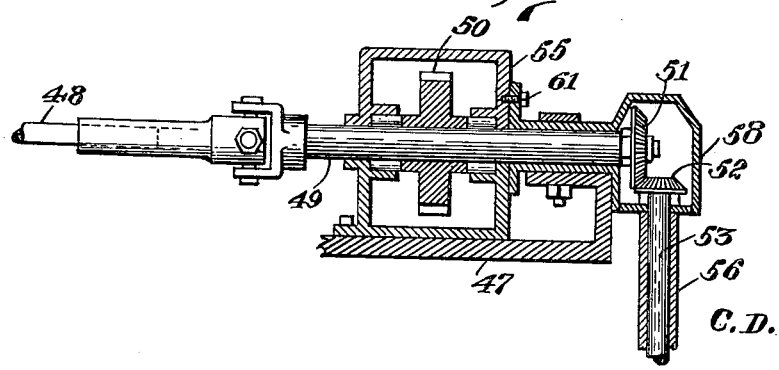

Sept. 3, 1957 C. D. RITCHIE 2,804,813
TRACTOR POWERED ROTARY CULTIVATOR
Filed Dec. 16, 1953 3 Sheets-Sheet 3

INVENTOR
C. D. Ritchie

BY Frank W. Dahm
ATTORNEY

United States Patent Office 2,804,813
Patented Sept. 3, 1957

2,804,813

TRACTOR POWERED ROTARY CULTIVATOR

Coy Dayl Ritchie, Upland, Calif., assignor to Matlin's Nursery, Ontario, Calif., a corporation of California Application December 16, 1953, Serial No. 398,535

3 Claims. (Cl. 97—35)

My invention relates to a machine for cultivation of plants such as rose bushes, though it is useful in cultivation of various other plants, particularly of such varieties as are propagated by first developing a root stock and subsequently budding the root stock to preferred varieties of plants. Preliminary to budding it is desirable to remove the soil and weeds and other extraneous matter from about the stems or stalks of such plants as rose bushes before budding. This is usually done by manual labor, the men working on their knees to scrape out the earth between and alongside the plants and away from each individual plant, and necessarily the operation is slow and tedious and time-consuming. The machine of this invention is preferably drawn in low gear by means of a tractor, the tractor moving slowly but continuously along a row and doing the work of several men in very satisfactory manner. The machine can be made to work close to a row of plants and at each side of the row, it being moved slowly but continuously, and by careful guiding it will operate without injury to the plants.

Another object of the invention is to devise apparatus whereby dirt and weeds shall be removed from between and about the plants in a row but without injuring the plants in said row or retarding their growth materially.

Other objects and advantages of the invention will be understood upon consideration of the following specification and of the drawings annexed thereto and forming a part of this application.

Figure 7:
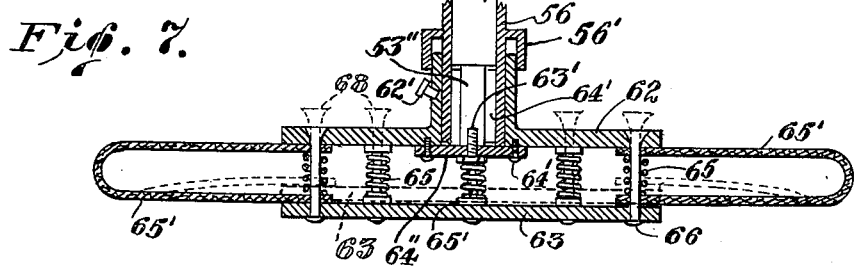
Figure 8:
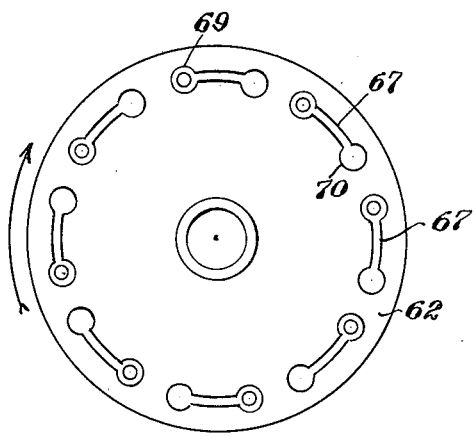

In the annexed drawings, wherein similar parts are indicated by similar reference characters:

Fig. 1 is a plan of the invention, the parts being shown as attached to a tractor such as the familiar McCormick Farmall tractor:

Fig. 2, a section on line 2—2 of Fig. 1,

Fig. 3, a section on line 3—3 of Fig. 1,

Fig. 4, a section on line 4—4 of Fig. 1,

Fig. 5, a section on line 5—5 of Fig. 4,

Fig. 6, a section on line 6—6 of Fig. 1,

Fig. 7, an enlarged sectional detail of a part shown in Fig. 1,

Fig. 8, a top plan of the device of Fig. 7, and

Figure 9:
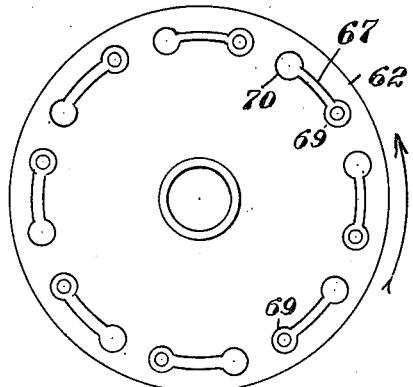

Fig. 9, a top plan of a device coacting with that in Fig. 8.

Referring now to the drawings, there are shown in Fig. 1 certain parts of a Farmall tractor for convenience of illustration of the manner of mounting of parts on a tractor, it being understood however that the devices of the invention may be mounted on tractors of other known makes by slight mechanical changes in their construction.

A main cross bar 10 is supported on diagonal frame members 15, 15 by means of clamps each comprising a U-shaped member 14, having legs passing thru holes in a bar 16 and having nuts 17 on the threaded ends of its legs. Each diagonal member 15 in turn is clamped to a side bar 20 by means of a U-shaped yoke 21 having threaded ends passing thru a bar 22, and nuts (not shown) on said ends.

Cultivator blades 21a, 21a are mounted at opposite sides of the machine so as to be adjustable along a cross bar 22', as by mounting them on pivots 23', 23' that are journaled in brackets 23, 23, the brackets being held in place on the cross bar 22' by means of tapered keys 24 located in holes in said brackets 23 so as to cause the keys to clamp the brackets to said bar 22'. Thus the blades 21a, 21a may be adjusted across the machine in known manner by knocking the keys back, moving the brackets to desired position and then driving the keys down again.

The blades 21a, 21a are supported at their forward ends by means including the diagonal bars 15, 15 to which the respective blades 21a, 21a are fastened by means including lugs 31 on blades 21a, said lugs being secured to the inner ends of brace bars 30, 30 by means including a lug 31 on each blade, said lugs being clamped to bars 30, 30 by caps 32 and bolts 33. The outer ends of bars 30, 30 are each clamped between the end of a bar 15 and a coacting member 15' (Fig. 1) by screws 28, 28. Bolts 29 extend upward from bars 30, 30 through holes in bars 15, 15 into suitably located holes in the tractor frame, these bolts being threaded at their upper ends to receive nuts by which the entire attachment is secured to the tractor.

The front ends of blades 21a, 21a may be adjusted toward or away from each other by loosening screws 28 and the assembly at 31 on each bar 15, then swinging them about their pivots 23', 23' as desired and then tightening bolts 28 and those of the assembly 31.

Blades 21a, 21a can be adjusted across the path of the machine so as to cut closer to or farther from the sides of a row of plants by driving back the keys 24, moving the brackets 23 as desired, and then driving the keys 24 down again to locking position. The forward ends of the blades 21 may be adjusted toward or away from the plant row by loosening bolts 28 and adjusting the blades 21, the assembly at 31 being, of course, loosened to permit such adjustment.

The frame members 15, 15 are connected to the cross bar 22' by means of clamps each of which may consist of a rigid bar 24' coacting with a yoke 25' shaped like the yokes 14 (Fig. 1) and having its arms threaded at their ends to receive nuts as at 17, (Fig. 1) or straps 29' may be attached at their ends to brackets 23 as by means of bolts (not shown).

Earth breakers are mounted on the bar 22' to follow the plow blades 21a and break the ridge of earth remaining in place after the blades 21a, 21a have passed the plants of the row, said plants standing in a narrow ridge of soil which must now be broken up and removed in order to dispose of all the weeds, stones and other foreign matter remaining between the plants in the row. For this purpose there are mounted on the bar 22' a pair of earth breakers, one at each side of the remaining ridge of earth, and close to the row at opposite sides of the plants so as to leave a ridge as narrow as possible. The earth breakers comprise corrugated wheels 36, 36 having the appearance of gears with spaced short teeth about their periphery, so arranged as to break up the ridge of earth that is left between the plows 21a, 21a the gears pass along opposite sides of the ridge of earth that is left by the plows so that the broken earth can be brushed out by the next unit of the series in the machine. The gears 36, 36 are loosely journaled on shafts each consisting of two parts, the one part 37 being a shaft fixed in an oblong support 38 that straddles the bar 22 and is fixed to the same by means of a tapered pin 39' driven into a hole in the oblong plate so as to clamp the plate 38 against the bar 22', whereas the lower part 39 is pivoted to the upper part 37 by a bolt 40 (Fig. 6) secured by a nut 44 and is adjustable about said bolt as a pivot to vary the relation of either or both of the gears 36, 36 to the plant row, by means of interengaging teeth 41 on the adjacent curved faces of the shaft sections 37 and 39, whereby the angle of each lower shaft section may be varied with respect to the plant row as shown in Fig. 6. The gears 36, 36 are loosely journaled on the lower ends of their shafts 39, 39 and are supported by disks 41' fixed to the shafts by screws 41'', said disks acting as cover plates at the lower end of the shafts 39 to keep dirt out of the bearings of the gears 36, 36. The upper faces of gears 36, 36 are covered by casings 42', 42', which, in turn, are covered by caps 42''. Oil may be injected into the casings 42' through inlets 43. The relation of either or both gears 36, 36, to the row of plants may be varied by backing off one or both of the nuts 44 so that the bolts 40 can be backed off and the teeth 41 disengaged, after which the shafts 39 can be swung about pivots 40 to locate them as desired and then the nuts 44 are tightened again to fix the gears in adjusted relation to the ridge of earth. The gears or earth breakers roll along opposite sides of the ridge of earth that supports the row of plants and crush the ridge so that the earth (and stones and weeds, if any) may be easily removed by the devices that follow the breakers, which are rotated by friction of their teeth on the ridge of earth formed by plows 21a, 21a as they roll along the ridge.

In addition to the adjustment of the earth breakers by moving shaft sections 39 they may be further varied in position by loosening the clamps that hold the bar 22' and tilting the bar forward or backward so as to throw the breakers forward or backward and then again tightening the clamps to hold the bar and the breakers in adjusted position. In order to insure holding of the bar 22' in adjusted position wedges may be inserted at the ends of bar 22', between said bar and the diagonal bars 15.

Following the breakers 36, 36 there are rotating beaters or whipping devices 65' on shafts in depending casings 56, 57 for beating out the loose dirt from between and around the plants in the row. The whipping devices are mounted on a platform 47 that is adjustable along a bar 10 and contains a shaft 49 connected to a power take-off shaft 48 of the tractor. Shaft 49 drives shaft 49' (Fig. 2) through gears 50, 51. The two whipping devices 65' are driven in opposite directions so as to throw earth, etc., away from between the plants in a row as the machine moves along the row. Casings 56 and 57 can be adjusted forward and backward by tilting bar 10 to vary the inclination of casings 56 and 57 and the enclosed beater shafts. This can be done by inserting wedges between the bar 10 and diagonal bars 15 at clamps 14, 16.

Shaft 49' is geared to an upright shaft 53 by gears 51, 52 in the casing 55 having a fixed depending portion 56 in which the shaft 53 rotates to drive one of a pair of whipping devices (Figs. 1, 4 and 7) said devices each comprising a casing having an upper plate 62 removably supporting a lower plate 63 by means of bolts 66. Bolts 66 have downwardly tapered upper ends 68 each engaging in a tapered hole 69 in the upper plate 62 (Figs. 8 and 9), said holes being of sufficient size to permit said tapered upper end of a bolt to seat itself in the hole at one end of a slot 67 in the plate 62, whereas at the other end of the slot there is a larger hole 70 through which the head 68 can pass.

The shafts 49, 49' are journaled in a casing 55 fixed to the platform 47, and said platform carries tubular casings 56, 57 at its front end, each casing enclosing one of a pair of shafts, one of which is shown at 53. Casings 56, 57 are integral with or fixed to the respective casings 58 and 59 that enclose respective pairs of gears 51, 52. Casings 58, 59 have slots 60 and are swingably adjustable on casing 55 by means of setscrews 61 (Fig. 5), extending through said slots and threaded into threaded holes in casing 55 for securing the casings 58 and 59 so as to position the beating means as desired for acting on the loosened earth to remove it from the plants in the row under treatment. At the lower ends of the shafts 53 there are beating means (Fig. 7) each comprising a plate 62 supported on a smaller plate 64'' fixed to plate 62 by screws 64a, the plate 64'' being attached to a reduced extension 53'' of shaft 53 by a screw 63' passing through the plate 64'' and into the end of said extension. Upright rollers 64' of a roller bearing are located between sleeve 56 and said extension 53''. Springs 65 tend to separate plates 62 and 63 so as to distend the power driven flexible fiber bands 65' that are extended by centrifugal force in the operation of the cultivator and thus whip out the weeds and earth close up to the plant row, and bands being made to throw dirt upward and outward by inclining their shafts backward as well as outward. The springs 65 hold the bands open as shown in Fig. 7.

By collapsing the springs 65, as shown in dotted lines in Fig. 7, and then turning the plate 63 relatively to the plate 62 the bolt heads 68 may be positioned in either of the sets of enlargements 69 and 70. In the latter position the plate 63 can be lowered and removed from the whipping device after the heads 68 have been passed through the holes 70 in plate 62. Then the worn fiber bands can be removed and replaced by others and the parts repositioned as in Fig. 7, all without disturbing other parts of the whipping device.

A shroud 56' fixed to casing 56 encircles shaft 53 to exclude dirt from the roller bearing 64' and supports said shaft by means of a gear 52 (Fig. 4) fixed to said shaft and supported by a roller bearing at 52'. The plate 62 has a neck encircling the lower end of hollow shaft casing 56 and covered by said shroud 56'.

An oil duct at 62' leads through said sleeve for lubricating said roller bearing. The whipping bands are held open by the expansion of springs 65 and the bands can be removed and replaced by forcing the lower plate toward the upper plate in each beater to collapse the springs and then turning the respective lower plates in the direction of the arrows (Figs. 8 and 9) to move the heads of the rivets 66 away from the counter-sunk portions 70 of the slots, whereupon the plates will be separated by the action of the springs and the beater bands can be replaced by new ones.

It will be understood that plows can be attached to the bars 20, 20 in rear of the mechanism above described, so as to throw loose dirt back against the sides of the row, if desired, and thus to protect the roots from injury by sun and rain and the like.

It will be obvious to those skilled in the art that many changes may be made in the devices herein disclosed, all without departing from the spirit of the invention, and therefore I do not limit myself to what is shown in the drawings and described in the specification but only as indicated in the appended claims.

Having thus fully described my invention, what I claim is:

1. In an agricultural machine, means for plowing soil away from the opposite sides of a row of plants, means acting laterally against the residual ridge of earth between said rows to break up the soil positively between the plants in a row, and flexible means following the breaking means for brushing out the loose soil about the plants in said row, said flexible brushing means including rotary beaters on upright shafts at opposite sides of the row being cultivated, and loops of flexible material secured at each end to the body of the beater and free between said ends so as to be adapted to act on the ridge of soil between the plants centrifugally to break up the soil of said ridge.

2. A device as in claim 1, wherein the loops are attached at vertically spaced points to the beaters, and springs are mounted to spread the legs of said loops in a vertical direction.

3. A device as in claim 2, said beaters comprising vertically spaced disks supported on a depending shaft, pins extending across the space between said disks, said loops being secured at opposite ends to said pins, whereby the loops can be replaced readily, and keyhole slots in said disks for holding said pins.

References Cited in the file of this patent

UNITED STATES PATENTS

| | | |
|---|---|---|
| 1,141,997 | Vrooman et al. | June 8, 1915 |
| 1,629,678 | Burrow | May 24, 1927 |
| 1,765,358 | Donald | June 17, 1930 |
| 1,908,836 | Forbes | May 16, 1933 |
| 2,182,157 | McDermott | Dec. 5, 1939 |
| 2,196,636 | Longman | April 9, 1940 |
| 2,215,364 | Simmons et al. | Sept. 17, 1940 |
| 2,329,794 | Speck | Sept. 21, 1943 |
| 2,388,689 | Hebert | Nov. 13, 1945 |
| 2,569,464 | Edwards et al. | Oct. 2, 1951 |
| 2,669,067 | Severance | Feb. 16, 1954 |